(12) United States Patent
Brown

(10) Patent No.: US 10,197,462 B2
(45) Date of Patent: Feb. 5, 2019

(54) DIFFERENTIAL PRESSURE SENSOR FULL OVERPRESSURE PROTECTION DEVICE

(71) Applicant: Honeywell International Inc., Morris Plains, NJ (US)

(72) Inventor: Gregory C. Brown, Chanhassen, MN (US)

(73) Assignee: Honeywell International Inc., Morris Plains, NJ (US)

( * ) Notice: Subject to any disclaimer, the term of this patent is extended or adjusted under 35 U.S.C. 154(b) by 153 days.

(21) Appl. No.: 15/164,696

(22) Filed: May 25, 2016

(65) Prior Publication Data

US 2017/0343438 A1    Nov. 30, 2017

(51) Int. Cl.
*G01L 9/00*     (2006.01)
*G01L 13/02*    (2006.01)
*G01L 19/06*    (2006.01)

(52) U.S. Cl.
CPC .......... *G01L 9/0047* (2013.01); *G01L 9/0048* (2013.01); *G01L 9/0052* (2013.01); *G01L 9/0055* (2013.01); *G01L 13/025* (2013.01); *G01L 19/0618* (2013.01)

(58) Field of Classification Search
None
See application file for complete search history.

(56) References Cited

U.S. PATENT DOCUMENTS

| 4,072,058 A | 2/1978 | Whitehead, Jr. |
|---|---|---|
| 4,668,889 A | 5/1987 | Adams |
| 4,670,733 A | 6/1987 | Bell |

(Continued)

FOREIGN PATENT DOCUMENTS

| DE | 102007003544 | 7/2008 |
|---|---|---|
| EP | 2058639 | 5/2009 |

(Continued)

OTHER PUBLICATIONS

United States Patent and Trademark Office, "Notice of Allowance for U.S. Appl. No. 14/958,372", dated Jan. 16, 2018, pp. 1-12, Published in: US.

(Continued)

*Primary Examiner* — Manish S Shah
*Assistant Examiner* — Jean Morello
(74) *Attorney, Agent, or Firm* — Fogg & Powers LLC

(57) ABSTRACT

A pressure sensor die assembly for a differential pressure sensor comprises a base substrate including a first overpressure stop structure on a first surface, and a diaphragm structure coupled to the first surface. The diaphragm structure comprises a first side with a cavity section that includes a first cavity and a second cavity surrounding the first cavity, and a second side opposite from the first side. A pressure sensing diaphragm portion is defined by the first cavity and is located over the first overpressure stop structure. An overpressure diaphragm portion is defined by the second cavity. A top cap coupled to the second side of the diaphragm structure includes a second overpressure stop structure. The overpressure stop structures are each sized to support substantially all of a strained area of the pressure sensing diaphragm portion at an increasing overpressure on the first or second sides of the diaphragm structure.

20 Claims, 5 Drawing Sheets

(56) References Cited

U.S. PATENT DOCUMENTS

| | | | | |
|---|---|---|---|---|
| 4,833,920 A | * | 5/1989 | Knecht | G01L 9/0073 361/283.3 |
| 4,905,575 A | | 3/1990 | Knecht et al. | |
| 5,070,735 A | | 12/1991 | Reichert et al. | |
| 5,157,973 A | * | 10/1992 | Ciminelli | G01L 9/0073 361/283.4 |
| 5,264,820 A | * | 11/1993 | Kovacich | G01L 9/0055 338/36 |
| 5,290,972 A | | 3/1994 | Someya et al. | |
| 5,295,395 A | * | 3/1994 | Hocker | H01L 21/2007 257/E21.122 |
| 5,316,619 A | * | 5/1994 | Mastrangelo | G01L 9/0073 438/53 |
| 5,319,981 A | | 6/1994 | Mei et al. | |
| 5,333,504 A | | 8/1994 | Lutz et al. | |
| 5,447,071 A | * | 9/1995 | Hanson | G01L 9/0022 73/702 |
| 5,581,038 A | * | 12/1996 | Lampropoulos | A61B 5/0215 73/721 |
| 5,969,257 A | * | 10/1999 | De Bortoli | G01L 9/008 310/338 |
| 6,030,851 A | | 2/2000 | Grandmont et al. | |
| 6,595,066 B1 | * | 7/2003 | Kurtz | G01L 9/0055 338/42 |
| 8,350,345 B2 | | 1/2013 | Vaganov | |
| 9,891,129 B2 | * | 2/2018 | Longu | G01L 19/0618 |
| 2001/0001550 A1 | * | 5/2001 | Bryzek | B81B 3/0072 338/36 |
| 2003/0074973 A1 | * | 4/2003 | Kurtz | G01L 9/0042 73/754 |
| 2006/0081042 A1 | * | 4/2006 | Silverbrook | B60C 23/0408 73/146 |
| 2006/0086188 A1 | * | 4/2006 | Avramescu | G01L 9/0025 73/700 |
| 2009/0120194 A1 | | 5/2009 | Rahn et al. | |
| 2013/0068022 A1 | | 3/2013 | Jeung et al. | |
| 2014/0175583 A1 | | 6/2014 | Doyle et al. | |
| 2014/0290375 A1 | | 10/2014 | Brida | |
| 2015/0171316 A1 | | 6/2015 | Park et al. | |
| 2015/0276526 A1 | | 10/2015 | Wade | |

FOREIGN PATENT DOCUMENTS

| | | |
|---|---|---|
| JP | S59155971 | 9/1984 |
| JP | S62145130 | 6/1987 |

OTHER PUBLICATIONS

Rongyan et al., "High Overload Pressure Sensor Construct With Polysilicon Nanofilm", Mar. 2015, pp. 1414-1420, vol. 15, No. 3, Publisher: IEEE, Published in: US.

Brown, "Pressure Sensor Die Over Pressure Protection for High Over Pressure to Operating Span Ratios", U.S. Appl. No. 14/958,372, filed Dec. 3, 2015, Dec. 3, 2015, pp. 1-21, Published in: US.

European Patent Office, "Extended European Search Report from EP Application No. 16198301.0 dated Apr. 28, 2017", from Foreign Counterpart of U.S. Appl. No. 14/958,372, dated Apr. 28, 2017, pp. 1-11, Published in: EP.

European Patent Office, "Extended European Search Report for EP Application No. 17168570.4", from Foreign counterpart to U.S. Appl. No. 15/164,696, dated Oct. 19, 2017, pp. 1-16, Published in: EP.

European Patent Office, "Office Action from EP Application No. 17168570.4 dated Jun. 29, 2018", from Foreign Counterpart of U.S. Appl. No. 15/164,696, pp. 1-7, Published in: EP.

* cited by examiner

DIFFERENTIAL PRESSURE SENSOR FULL OVERPRESSURE PROTECTION DEVICE

BACKGROUND

Silicon pressure sensors used to measure pressure in various systems and devices are often subjected to overpressures that exceed the full scale pressure rating of the sensor. Typical silicon sensors employing a deflectable on chip diaphragm to measure pressure are capable of withstanding an overpressure of three to four times full scale pressure. If this level of overpressure rating is exceeded, the diaphragm will rupture, causing the pressure sensor to fail. Many applications require overpressure capability that can handle overpressures of ten times full scale or higher.

Conventional silicon pressure sensors are often protected from overpressure failure by external overpressure protection mechanisms. Such mechanisms add significant cost, complexity, and size to the pressure sensor function.

In other approaches for sensor protection, a deflection stop under the silicon pressure sensing diaphragm is employed such that the deflection is stopped after two times to three times full scale overpressure. While this is effective for overpressures less than about five times full scale, above that level, the overpressure loads the outer edges of the diaphragm even though the center is supported so that a shear failure occurs along the outer edge of the diaphragm, resulting in diaphragm failure.

SUMMARY

A pressure sensor die assembly for a differential pressure sensor comprises a base substrate having a first surface and including a first overpressure stop structure on the first surface, and a diaphragm structure coupled to the first surface. The diaphragm structure comprises a first side with a cavity section that includes a first cavity and a second cavity surrounding the first cavity, and a second side opposite from the first side; a pressure sensing diaphragm portion having a first thickness and defined by the first cavity, the pressure sensing diaphragm portion located over and spaced apart from the first overpressure stop structure such that the first overpressure stop structure protrudes into a portion of the first cavity; and an overpressure diaphragm portion having a second thickness and defined by the second cavity, the second thickness greater than the first thickness of the pressure sensing diaphragm portion. The pressure sensing diaphragm portion has a pressure sensing surface on the second side of the diaphragm structure opposite from the first side. A top cap is coupled to the second side of the diaphragm structure and has a lower surface, with the top cap including a second overpressure stop structure on the lower surface. A gap is located between the pressure sensing surface and the second overpressure stop structure prior to overpressure being applied. When overpressure is applied to the first side of the diaphragm structure, at least some area of the pressure sensing diaphragm portion is deflected such that at least a portion of the pressure sensing surface is in contact with the second overpressure stop structure. When overpressure is applied to the second side of the diaphragm structure, at least some area of the pressure sensing diaphragm portion is deflected and supported by the first overpressure stop structure. The first and second overpressure stop structures are each sized to support substantially all of a strained area of the pressure sensing diaphragm portion at an increasing overpressure on the first or second sides of the diaphragm structure.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1A:
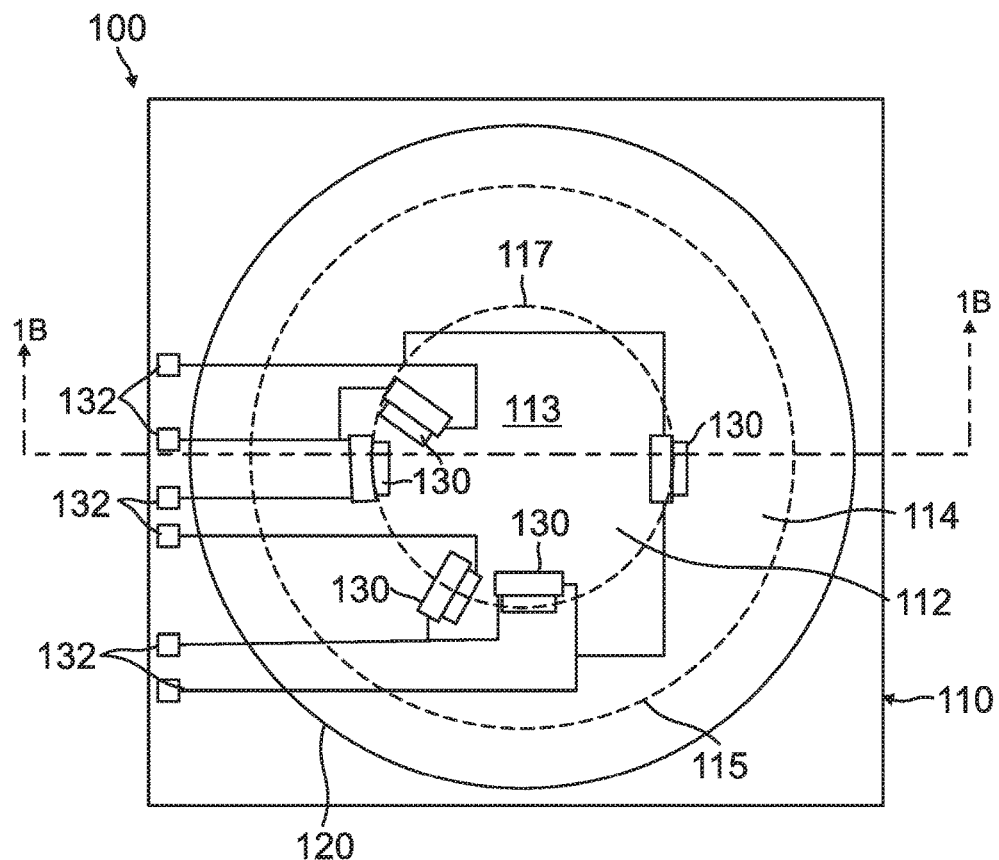
FIG. 1A is a top view of a differential pressure sensor die assembly with overpressure protection, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A differential pressure sensor die assembly for a pressure sensor is provided with overpressure protection, such that a sensing diaphragm of the pressure sensor can withstand repeated overpressure cycles from either a high or low side pressure source. The present approach provides overpressure stop structures integral to a sensor die such as a silicon die structure, which is capable of operating at ten times full scale or higher of repeated overpressure cycles without failure.

The differential pressure sensor die assembly generally comprises a base substrate with a high side overpressure stop structure, a diaphragm structure coupled to the base substrate, and a top cap with a low side overpressure stop structure, with top cap coupled over the diaphragm structure. The diaphragm structure includes an outer overpressure diaphragm that is concentric with a pressure sensing diaphragm. The outer overpressure diaphragm is sized to be stiffer than the pressure sensing diaphragm.

In the case of a differential pressure sensor both sides (high and low sides) of the pressure sensing diaphragm are exposed to pressure sources. The differential pressure sensor measures the difference in pressure between these pressure sources, and either side of the pressure sensing diaphragm can have an overpressure applied thereto. The overpressure stop structures provide overpressure protection for both high side and low side overpressure events. The area of support by the support structures increases with increased overpressure and greatly reduces the shear loading on the thin pressure sensing diaphragm.

During operation of a pressure sensor that includes the differential pressure sensor die assembly, as overpressure is increased above about 2-3 times full scale, the outer overpressure diaphragm deflects such that a larger area of the pressure sensing diaphragm is supported by one of the stop structures. As this occurs, the pressure loaded area of the pressure sensing diaphragm is reduced, which reduces the shear loading in pounds per square inch (psi) along the outer perimeter of the pressure sensing diaphragm.

As the overpressure continues to increase, the pressure sensing diaphragm is fully supported by the stop structure, and for very high overpressures, the stresses become compressive as the pressure sensing diaphragm is deflected above its null position by the stop structure due to the outer overpressure diaphragm's continued deflection. At approximately 10 times full scale of overpressure, the outer overpressure diaphragm contacts the base substrate or the top cap and is also deflection limited.

The overpressure protection for the differential pressure sensor die assembly improves the maximum burst pressure when used in pressure sensors that are employed in a variety of aerospace and downhole drilling applications. By using the present differential pressure sensor die assembly, it is possible to expose a silicon pressure sensor to overpressures of up to about 100 times full scale without failure.

Further details of various embodiments are described hereafter with reference to the drawings.

Figure 1B:
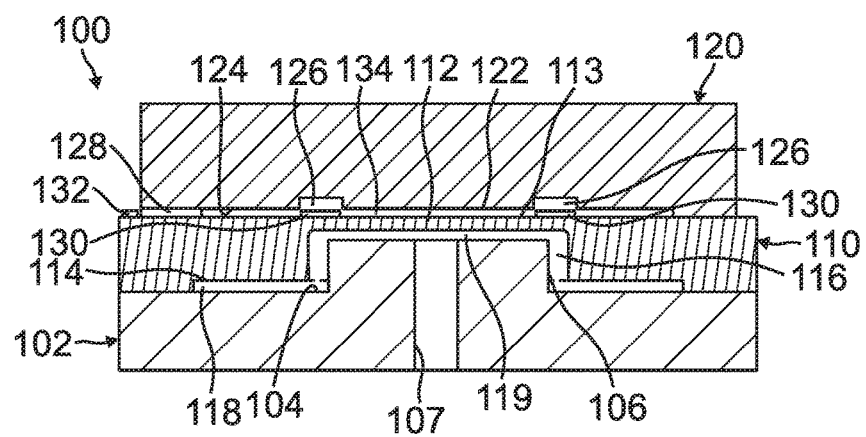
FIG. 1B is a cross-sectional side view of the differential pressure sensor die assembly of FIG. 1A.

FIGS. 1A and 1B illustrate a differential pressure sensor die assembly 100 that includes high and low side overpressure protection, according to one embodiment. The differential pressure sensor die assembly 100 generally comprises a base substrate 102 with a high side overpressure stop structure 106, a diaphragm structure 110 coupled to base substrate 102, and a top cap 120 with a low side overpressure stop structure 122, with top cap 120 coupled to diaphragm structure 110.

The pressure sensor die assembly 100 can be formed using batch fabrication techniques with multiple wafers, which is described further hereafter. Each of base substrate 102, diaphragm structure 110, and top cap 120 can comprise a material selected from silicon, germanium, glass, sapphire, a metal, a ceramic such as silicon carbide, or the like. The top cap 120 is shown in FIG. 1A as being transparent for ease in illustrating the underlying structures.

As shown in FIG. 1B, base substrate 102 has a first surface 104, with overpressure stop structure 106 protruding from first surface 104. A channel 107 for connecting the pressure signal to the sensing diaphragm passes through a central portion of base substrate 102 and overpressure stop structure 106.

The diaphragm structure 110 includes a pressure sensing diaphragm portion 112, and an overpressure diaphragm portion 114 concentric with and surrounding pressure sensing diaphragm portion 112. As such, overpressure diaphragm portion 114 has an outer circumference 115 that is greater than an outer circumference 117 of pressure sensing diaphragm portion 112. (FIG. 1A).

The diaphragm structure 110 has a first side that is coupled to a portion of first surface 104. The first side of diaphragm structure 110 has a concentric cavity section that includes a first cavity 116 having a first depth, and a second cavity 118 having a second depth less than the first depth and surrounding first cavity 116. In one embodiment, first cavity 116 and second cavity 118 are concentric circular cavities. In an alternative embodiment, first cavity 116 and second cavity 118 can be rectangular cavities, such that pressure sensing diaphragm portion 112 has a rectangular shape and is surrounded by overpressure diaphragm portion 114 also with a rectangular shape.

The pressure sensing diaphragm portion 112 has a pressure sensing surface 113 on a second side of diaphragm structure 110 opposite from the first side. The pressure sensing diaphragm portion 112 has a first thickness and is defined by first cavity 116. The pressure sensing diaphragm portion 112 is located over and spaced apart from overpressure stop structure 106, with overpressure stop structure 106 protruding into a portion of first cavity 116. The pressure sensing diaphragm portion 112 is separated from overpressure stop structure 106 by a gap 119 in first cavity 116. The overpressure stop structure 106 protrudes into first cavity 116 such that gap 119 is maintained when no pressure is applied to pressure sensing diaphragm portion 112.

The overpressure diaphragm portion 114 has a second thickness that is greater than the first thickness of pressure sensing diaphragm portion 112, as depicted in FIG. 1B. The overpressure diaphragm portion 114 is defined by second cavity 118.

A plurality of piezoelectric bridge resistors 130 can be coupled around pressure sensing surface 113, such as shown in FIG. 1A. In one embodiment, each of piezoelectric bridge resistors 130 are electrically connected to a plurality of wire bond pads 132 on diaphragm structure 110, for providing electrical connections in a pressure sensor package.

As illustrated in FIG. 1B, top cap 120 has a lower surface 124, with low side overpressure stop structure 122 located on lower surface 124. The lower surface 124 also includes multiple recessed areas 126 adjacent to overpressure stop structure 122, and multiple undercut portions 128 around a lower periphery. The top cap 120 is structured such that when coupled to diaphragm structure 110, a gap 134 is located between pressure sensing surface 113 and overpressure stop structure 122 prior to a low side overpressure being applied.

As described further hereafter, overpressure stop structures 106 and 122 are configured to resist travel of pressure sensing diaphragm portion 112 due to high side or low side overpressure events. In addition, overpressure stop structure 106 can be sized to support substantially all of a strained area of pressure sensing diaphragm portion 112 as the high side overpressure is increased. Similarly, overpressure stop structure 122 can be sized to support substantially all of a strained area of pressure sensing diaphragm portion 112 as the low side overpressure is increased.

The recessed areas 126 in top cap 120 provide clearance for piezoelectric bridge resistors 130 so they are not damaged during a low side overpressure event. The top cap 120 is smaller in area than diaphragm structure 110 such that wire bond pads 132 can be formed outside the periphery of top cap 120. Interconnections to wire bond pads 132 from piezoelectric bridge resistors 130 can be run through undercut portions 128. The undercut portions 128 also allow pressure media to reach pressure sensing diaphragm portion 112, which senses the low side media pressure.

FIG. 1B illustrates the configuration of pressure sensor die assembly 100 with no overpressure applied to pressure sensing diaphragm portion 112. In this configuration, gap 134 is maintained between overpressure stop structure 122 and pressure sensing diaphragm portion 112 prior to an overpressure event.

Figure 2A:
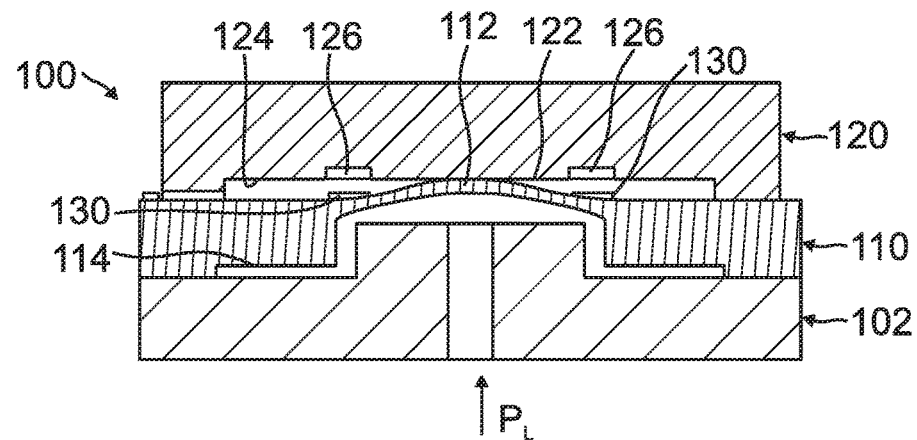
FIGS. 2A and 2B are cross-sectional side views illustrating operation of the differential pressure sensor die assembly of FIGS. 1A and 1B, which is subjected to increasing low side overpressure.
Figure 2B:
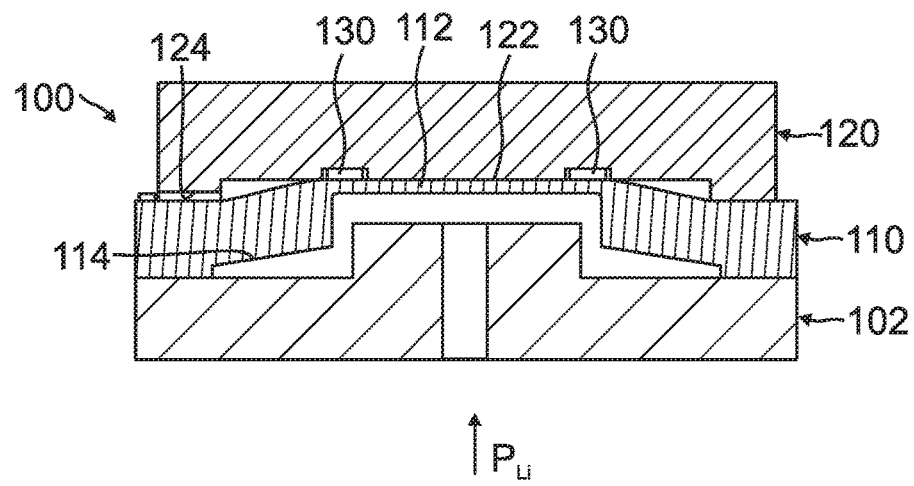

FIGS. 2A and 2B illustrate the operation of pressure sensor die assembly 100 during a low side overpressure event. When a moderate low side overpressure ($P_L$) is applied, at least some area of pressure sensing diaphragm portion 112 is deflected against overpressure stop structure 122, as depicted in FIG. 2A. For example, an overpressure of about 3-6 times full scale results in the configuration shown in FIG. 2A.

As the low side overpressure is increased ($P_{Li}$), overpressure diaphragm portion 114 deflects toward lower surface 124 of top cap 120, such that additional area of pressure sensing diaphragm portion 112 is deflected against overpressure stop structure 122, as depicted in FIG. 2B. For example, a low side overpressure of up to about 100 times full scale results in the configuration shown in FIG. 2B, where substantially all of the strained area of pressure sensing diaphragm portion 112 is supported by overpressure stop structure 122. A more favorable reduction in shear loading occurs as more of the area of overpressure stop structure 122 is contacted by pressure sensing diaphragm portion 112.

Figure 3A:
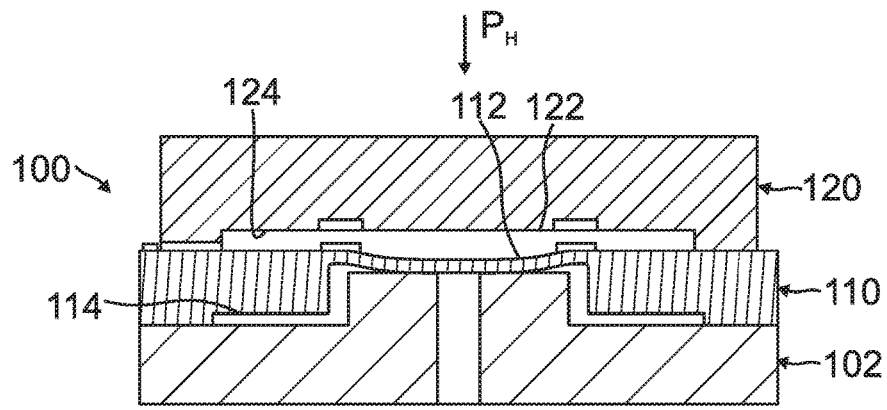
FIGS. 3A and 3B are cross-sectional side views illustrating operation of the differential pressure sensor die assembly of FIGS. 1A and 1B, which is subjected to increasing high side overpressure.
Figure 3B:
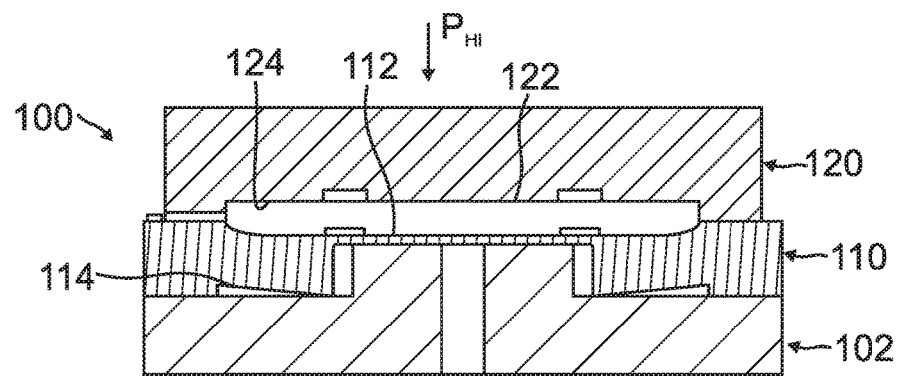

FIGS. 3A and 3B illustrate the operation of pressure sensor die assembly 100 during a high side overpressure event. When a moderate high side overpressure ($P_H$) is applied, at least some area of pressure sensing diaphragm portion 112 is deflected and supported by overpressure stop structure 106 on base substrate 102, as depicted in FIG. 3A. For example, an overpressure of about 3 times full scale results in the configuration shown in FIG. 3A. In this configuration, pressure sensing diaphragm portion 112 is deflected such that a part of the lower surface area of pressure sensing diaphragm portion 112 is supported by overpressure stop structure 106, while overpressure diaphragm portion 114 has not yet engaged with base substrate 102.

As the high side overpressure is increased ($P_{Hi}$), overpressure diaphragm portion 114 deflects such that additional area of pressure sensing diaphragm portion 112 is deflected and supported by overpressure stop structure 106, as depicted in FIG. 3B. For example, an overpressure of greater than about 6 times full scale results in the configuration shown in FIG. 3B. In this configuration, overpressure diaphragm portion 114 deflects such that additional lower surface area of pressure sensing diaphragm portion 112 is supported by overpressure stop structure 106. As the overpressure continues to increase, overpressure diaphragm portion 114 becomes fulling engaged and stopped by base substrate 102, and substantially all of the strained area of pressure sensing diaphragm portion 112 is supported by overpressure stop structure 106.

FIGS. 4A-4F illustrate a method of fabricating pressure sensor die assemblies with overpressure protection, such as pressure sensor die assembly 100. Although fabrication of two pressure sensor die assemblies is shown in FIGS. 4A-4F, it should be understood that additional pressure sensor die assemblies can be fabricated across one or more wafers used during the process by repeating the patterned structures shown.

Figure 4A:
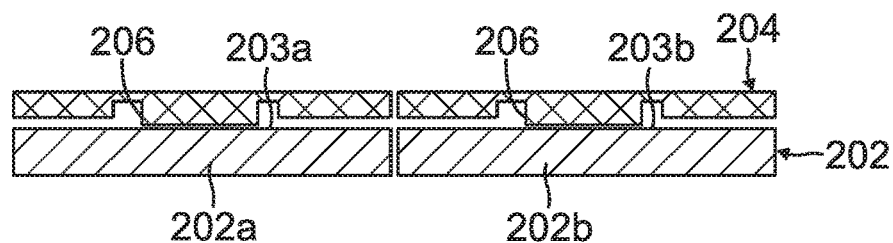
FIGS. 4A-4F are cross-sectional side views illustrating a method of fabricating differential pressure sensor die assemblies with overpressure protection.

As depicted in FIG. 4A, a base wafer 202 is provided, such as a silicon wafer, which is configured to form a plurality of base substrates 202a, 202b for the pressure sensor die assemblies. A stop wafer 204 is also provided that is patterned with a plurality of protruding structures 206 that will form the high side overpressure stop structures for each pressure sensor die assembly. The stop wafer 204 is attached to base wafer 202, such as by a low temperature wafer to wafer bonding technique, such that protruding structures 206 are respectively coupled to upper surfaces 203a, 203b of base substrates 202a, 202b.

Figure 4B:
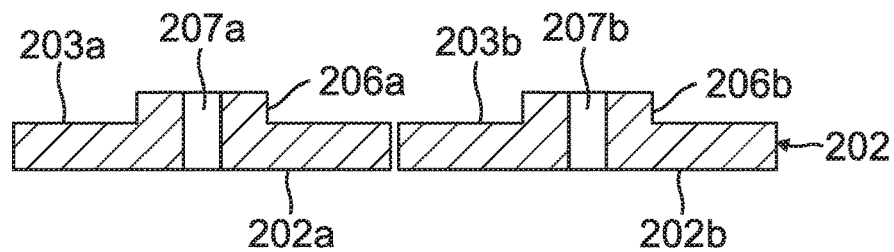

Next, selected portions of stop wafer 204 are removed, such as by etching or laser trimming, resulting in protruding structures 206 remaining coupled to upper surfaces 203a, 203b to form high side overpressure stop structures 206a, 206b, as shown in FIG. 4B. Channels 207a, 207b are then respectively formed through a central portion of each of base substrates 202a, 202b and stop structures 206a, 206b. The channels 207a, 207b can be formed by an etching process, for example.

Figure 4C:
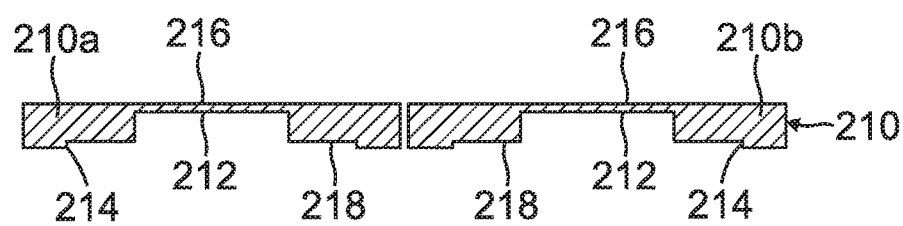

As illustrated in FIG. 4C, a patterned diaphragm wafer 210 is provided, which is configured to form a plurality of diaphragm structures 210a, 210b for the pressure sensor die assemblies. The diaphragm structures 210a, 210b are each patterned with a two step, cavity section that includes a first cavity 212 having a first depth, and a second cavity 214 having a second depth that is less than the first depth and surrounding first cavity 212. A precision etching process can be used to form cavities 212 and 214. The cavity section defines a pressure sensing diaphragm portion 216 and a surrounding overpressure diaphragm portion 218 for each of diaphragm structures 210a, 210b. The pressure sensing diaphragm portion 216 is defined by first cavity 212, and overpressure diaphragm portion 218 is defined by second cavity 214.

In one embodiment, first cavity 212 is partially formed first by applying a photoresist over a first side of diaphragm wafer 210 except in the area what will define pressure sensing diaphragm portion 216. The first cavity 212 is then etched until it is approximately at the desired full depth less the depth for second cavity 214. The second cavity 214 is then formed on diaphragm wafer 210 by applying photoresist everywhere on the first side except on the area that will define overpressure diaphragm portion 218. The wafer material is etched away in this area to form second cavity 214 at the desired depth, which defines overpressure diaphragm portion 218, and simultaneously, first cavity 212 is etched further to the desired full depth. A conventional etch stop strategy can be used to control the cavity etch depths.

The pressure sensing diaphragm portion 216 and overpressure diaphragm portion 218 can be sized using either standard deformable body equations for stress, strain and deflection, or by finite element analysis. In one embodiment, overpressure diaphragm portion 218 is formed and sized to have a stiffness that is greater than a stiffness of pressure sensing diaphragm portion 216.

Figure 4D:
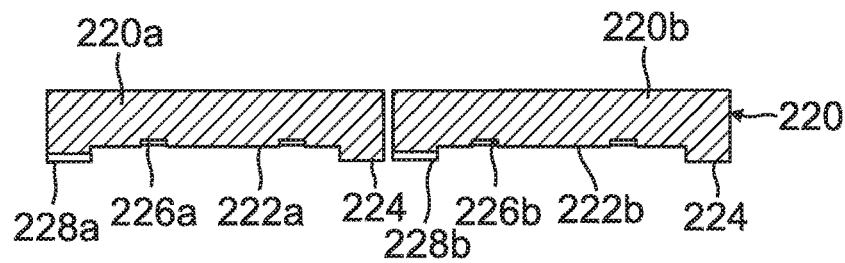

As illustrated in FIG. 4D, a patterned top cap wafer 220 is provided, which is configured to form a plurality of top caps 220a, 220b with respective low side overpressure stop structures 222a, 222b on a lower surface 224. Multiple recessed areas 226a, 226b and undercut portions 228a, 228b are etched on lower surface 224 to provide clearance for piezoelectric bridge resistors and metal interconnects on diaphragm structures 210a, 210b. The etching is done on the same surface in the sawing lanes to provide height clearance for sawing the top caps 220a, 220b to smaller dimensions than diaphragm structures 210a, 210b.

In one embodiment, high side overpressure stop structures 206a, 206b are sized to support substantially all of a strained area of pressure sensing diaphragm portion 216 at an increasing high side overpressure. Similarly, low side overpressure stop structures 222a, 222b are sized to support substantially all of a strained area of pressure sensing diaphragm portion 216 at an increasing low side overpressure.

Figure 4E:
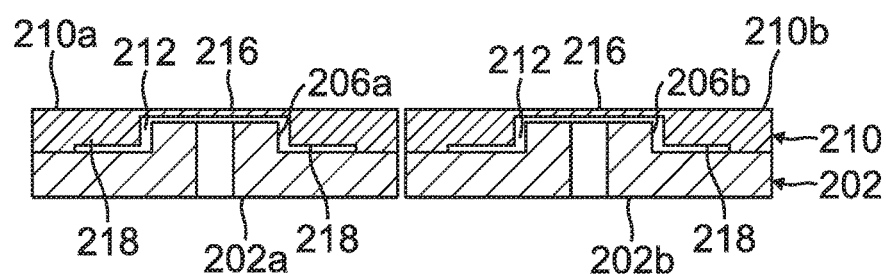

As depicted in FIG. 4E, the patterned diaphragm wafer 210 is attached to base wafer 202 with stop structures 206a, 206b (FIG. 4B), such as by a low temperature wafer to wafer bonding technique. This bonding technique allows pressure sensing piezoelectric bridge resistors to be fabricated on diaphragm wafer 210 before the wafer to wafer bonding. In this configuration, stop structures 206a, 206b respectively protrude into first cavity 212 of each diaphragm structure 210a, 210b, such that a gap is maintained between the stop structures and pressure sensing diaphragm portion 216 at a normal pressure. In addition, second cavity 214 (FIG. 4C) of each diaphragm structure 210a, 210b provides a gap between the upper surfaces of base substrates 202a, 202b and overpressure diaphragm portion 218.

Figure 4F:
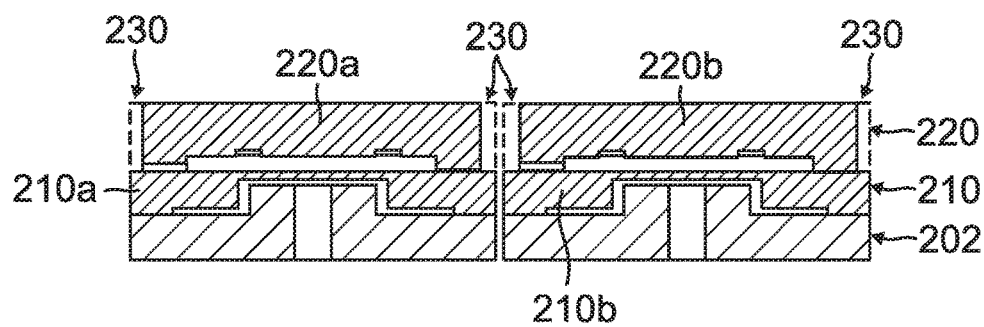

Next, as shown in FIG. 4F, the patterned top cap wafer 220 is coupled to patterned diaphragm wafer 210, such as by a low temperature wafer to wafer bonding technique. The top caps 220a, 220b are then sawed to smaller dimensions than diaphragm structures 210a, 210b, as indicated at 230. The bonded wafers 202, 210, and 220 are then divided to produce separate pressure sensor die assemblies, which can be incorporated into a variety of pressure sensor devices.

Example Embodiments

Example 1 includes a pressure sensor die assembly for a differential pressure sensor, comprising: a base substrate having a first surface and including a first overpressure stop structure on the first surface; a diaphragm structure coupled to the first surface and comprising a first side with a cavity section that includes a first cavity and a second cavity surrounding the first cavity, and a second side opposite from the first side; a pressure sensing diaphragm portion having a first thickness and defined by the first cavity, the pressure sensing diaphragm portion located over and spaced apart from the first overpressure stop structure such that the first overpressure stop structure protrudes into a portion of the first cavity; and an overpressure diaphragm portion having a second thickness and defined by the second cavity, the second thickness greater than the first thickness of the pressure sensing diaphragm portion. The pressure sensing diaphragm portion has a pressure sensing surface on the second side of the diaphragm structure opposite from the first side. A top cap is coupled to the second side of the diaphragm structure and has a lower surface, with the top cap including a second overpressure stop structure on the lower surface, wherein a gap is located between the pressure sensing surface and the second overpressure stop structure prior to overpressure being applied. When overpressure is applied to the first side of the diaphragm structure, at least some area of the pressure sensing diaphragm portion is deflected such that at least a portion of the pressure sensing surface is in contact with the second overpressure stop structure. When overpressure is applied to the second side of the diaphragm structure, at least some area of the pressure sensing diaphragm portion is deflected and supported by the first overpressure stop structure. The first and second overpressure stop structures are each sized to support substantially all of a strained area of the pressure sensing diaphragm portion at an increasing overpressure on the first or second sides of the diaphragm structure.

Example 2 includes the pressure sensor die assembly of Example 1, wherein the base substrate, the diaphragm structure, and the top cap each include a material comprising silicon, germanium, sapphire, glass, a metal, or a ceramic.

Example 3 includes the pressure sensor die assembly of any of Examples 1-2, wherein the overpressure diaphragm portion has a stiffness that is greater than a stiffness of the pressure sensing diaphragm portion.

Example 4 includes the pressure sensor die assembly of any of Examples 1-3, wherein the first cavity has a first depth, and the second cavity has second depth that is less than the first depth.

Example 5 includes the pressure sensor die assembly of any of Examples 1-4, wherein the first cavity and the second cavity are concentric circular cavities, such that the overpressure diaphragm portion has an outer circumference that is greater than an outer circumference of the pressure sensing diaphragm portion.

Example 6 includes the pressure sensor die assembly of any of Examples 1-4, wherein the first cavity and the second cavity are rectangular cavities.

Example 7 includes the pressure sensor die assembly of any of Examples 1-6, wherein the first overpressure stop structure protrudes into a portion of the first cavity such that a gap is maintained between the first overpressure stop structure and the pressure sensing diaphragm portion prior to overpressure being applied to the diaphragm structure.

Example 8 includes the pressure sensor die assembly of any of Examples 1-7, further comprising a plurality of piezoelectric bridge resistors coupled to the pressure sensing surface, the piezoelectric bridge resistors electrically connected to a plurality of bond pads on the diaphragm structure.

Example 9 includes the pressure sensor die assembly of Example 8, wherein the lower surface of the top cap includes multiple recessed areas adjacent to the second overpressure stop structure, and multiple undercut portions around a lower periphery of the top cap.

Example 10 includes the pressure sensor die assembly of Example 9, wherein the multiple recessed areas are configured to provide clearance for the piezoelectric bridge resistors when overpressure is applied to the first side of the diaphragm structure.

Example 11 includes the pressure sensor die assembly of Example 10, wherein the top cap is smaller in area than the diaphragm structure such that the bond pads on the diaphragm structure are located outside a periphery of the top cap.

Example 12 includes the pressure sensor die assembly of Example 11, wherein interconnections to the bond pads from the piezoelectric bridge resistors run through the undercut portions.

Example 13 includes the pressure sensor die assembly of any of Examples 1-12, wherein the pressure sensor die assembly is configured for exposure to an overpressure of up to about 100 times full scale.

Example 14 includes a method of fabricating one or more differential pressure sensor die assemblies with overpressure protection, the method comprising: providing a base wafer configured with one or more base substrates; patterning a stop wafer with one or more protruding structures; attaching the stop wafer to the base wafer such that the one or more protruding structures are respectively coupled to the one or more base substrates; removing selected portions of the stop wafer attached to the base wafer such that the one or more protruding structures remain coupled to the one or more base substrates to form a first overpressure stop structure on each base substrate; patterning a diaphragm wafer to form one or more diaphragm structures each with a two step cavity section that includes a first cavity having a first depth, and a second cavity having a second depth less than the first depth and surrounding the first cavity, wherein the one or more diaphragm structures each include a pressure sensing diaphragm portion defined by the first cavity, and an overpressure diaphragm portion that surrounds the pressure sensing diaphragm portion and is defined by the second cavity; patterning a top cap wafer to form one or more top caps each with a second overpressure stop structure on a lower surface of each top cap; attaching the patterned diaphragm wafer to the base wafer such that each first overpressure stop structure respectively protrudes into the first cavity of the one or more diaphragm structures, wherein a gap is maintained between the first overpressure stop structure and the pressure sensing diaphragm portion prior to a high side overpressure being applied to the diaphragm structure; and attaching the patterned top cap wafer to the patterned diaphragm wafer such that a gap is maintained between the second overpressure stop structure and the pressure sensing diaphragm portion prior to a low side overpressure being applied to the diaphragm structure; wherein the first and second overpressure stop structures are each sized to support substantially all of a strained area of the pressure sensing diaphragm portion at an increasing high side or low side overpressure.

Example 15 includes the method of Example 14, further comprising forming a plurality of piezoelectric bridge resistors on the diaphragm wafer prior to attaching the diaphragm wafer to the base wafer.

Example 16 includes the method of Example 15, wherein the piezoelectric bridge resistors are electrically connected to a plurality of bond pads formed on the diaphragm structure.

Example 17 includes the method of Example 16, wherein prior to attaching the patterned top cap wafer to the patterned diaphragm wafer, the method further comprises forming multiple recessed areas in the lower surface of each top cap adjacent to the second overpressure stop structure, and forming multiple undercut portions around a lower periphery of each top cap.

Example 18 includes the method of Example 17, wherein the multiple recessed areas are sized to provide clearance for the piezoelectric bridge resistors when the low side overpressure is applied.

Example 19 includes the method of any of Examples 16-18, further comprising sawing the patterned top cap wafer such that each top cap is smaller in area than the underlying diaphragm structure, allowing the bond pads on the diaphragm structure to be located outside a periphery of each top cap.

Example 20 includes a differential pressure sensor comprising a base substrate including a first overpressure stop structure on a first surface; and a diaphragm structure coupled to the first surface and comprising: a first side with a cavity section that includes a first cavity and a second cavity surrounding the first cavity, and a second side opposite from the first side; a pressure sensing diaphragm portion defined by the first cavity and located over the first overpressure stop structure; and an overpressure diaphragm portion defined by the second cavity. A top cap is coupled to the second side of the diaphragm structure and has a lower surface, the top cap including a second overpressure stop structure on the lower surface, wherein a gap is located between the pressure sensing diaphragm portion and the second overpressure stop structure prior to overpressure being applied. The first and second overpressure stop structures are each sized to support substantially all of a strained area of the pressure sensing diaphragm portion at an increasing overpressure on the first or second sides of the diaphragm structure.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A pressure sensor die assembly for a differential pressure sensor, comprising:
   a base substrate having a first surface and including a first overpressure stop structure on the first surface;
   a diaphragm structure coupled to the first surface and comprising:
     a first side with a cavity section that includes a first cavity and a second cavity surrounding the first cavity, and a second side opposite from the first side;
     a pressure sensing diaphragm portion having a first thickness and defined by the first cavity, the pressure sensing diaphragm portion located over and spaced apart from the first overpressure stop structure such that the first overpressure stop structure protrudes into a portion of the first cavity; and
     an overpressure diaphragm portion having a second thickness and defined by the second cavity, the second thickness greater than the first thickness of the pressure sensing diaphragm portion;
     wherein the pressure sensing diaphragm portion has a pressure sensing surface on the second side of the diaphragm structure opposite from the first side; and
   a top cap coupled to the second side of the diaphragm structure and having a lower surface, the top cap including a second overpressure stop structure on the lower surface, wherein a gap is located between the pressure sensing surface and the second overpressure stop structure prior to overpressure being applied;
   wherein when overpressure is applied to the first side of the diaphragm structure, at least some area of the pressure sensing diaphragm portion is deflected such that at least a portion of the pressure sensing surface is in contact with the second overpressure stop structure;
   wherein when overpressure is applied to the second side of the diaphragm structure, at least some area of the pressure sensing diaphragm portion is deflected and supported by the first overpressure stop structure;
   wherein the first and second overpressure stop structures are each sized to support substantially all of a strained area of the pressure sensing diaphragm portion at an increasing overpressure on the first or second sides of the diaphragm structure.

2. The pressure sensor die assembly of claim 1, wherein the base substrate, the diaphragm structure, and the top cap each include a material comprising silicon, germanium, sapphire, glass, a metal, or a ceramic.

3. The pressure sensor die assembly of claim 1, wherein the overpressure diaphragm portion has a stiffness that is greater than a stiffness of the pressure sensing diaphragm portion.

4. The pressure sensor die assembly of claim 1, wherein the first cavity has a first depth, and the second cavity has second depth that is less than the first depth.

5. The pressure sensor die assembly of claim 4, wherein the first cavity and the second cavity are concentric circular cavities, such that the overpressure diaphragm portion has an outer circumference that is greater than an outer circumference of the pressure sensing diaphragm portion.

6. The pressure sensor die assembly of claim 4, wherein the first cavity and the second cavity are rectangular cavities.

7. The pressure sensor die assembly of claim 1, wherein the first overpressure stop structure protrudes into a portion of the first cavity such that a gap is maintained between the first overpressure stop structure and the pressure sensing diaphragm portion prior to overpressure being applied to the diaphragm structure.

8. The pressure sensor die assembly of claim 1, further comprising a plurality of piezoelectric bridge resistors coupled to the pressure sensing surface, the piezoelectric bridge resistors electrically connected to a plurality of bond pads on the diaphragm structure.

9. The pressure sensor die assembly of claim 8, wherein the lower surface of the top cap includes multiple recessed areas adjacent to the second overpressure stop structure, and multiple undercut portions around a lower periphery of the top cap.

10. The pressure sensor die assembly of claim 9, wherein the multiple recessed areas are configured to provide clearance for the piezoelectric bridge resistors when overpressure is applied to the first side of the diaphragm structure.

11. The pressure sensor die assembly of claim 10, wherein the top cap is smaller in area than the diaphragm structure such that the bond pads on the diaphragm structure are located outside a periphery of the top cap.

12. The pressure sensor die assembly of claim 11, wherein interconnections to the bond pads from the piezoelectric bridge resistors run through the undercut portions.

13. The pressure sensor die assembly of claim 1, wherein the pressure sensor die assembly is configured for exposure to an overpressure of up to about 100 times full scale.

14. A differential pressure sensor, comprising:
a base substrate including a first overpressure stop structure on a first surface of the base substrate;
a diaphragm structure coupled to the first surface and comprising:
  a first side with a cavity section that includes a first cavity and a second cavity surrounding the first cavity, and a second side opposite from the first side;
  a pressure sensing diaphragm portion having a first thickness and defined by the first cavity, the pressure sensing diaphragm portion located over and spaced apart from the first overpressure stop structure such that the first overpressure stop structure protrudes into a portion of the first cavity; and
  an overpressure diaphragm portion having a second thickness and defined by the second cavity, the second thickness greater than the first thickness of the pressure sensing diaphragm portion; and
a top cap coupled to the second side of the diaphragm structure and having a lower surface, the top cap including a second overpressure stop structure on the lower surface, wherein a gap is located between the pressure sensing diaphragm portion and the second overpressure stop structure prior to overpressure being applied;
wherein the first and second overpressure stop structures are each sized to support substantially all of a strained area of the pressure sensing diaphragm portion at an increasing overpressure on the first or second sides of the diaphragm structure.

15. The differential pressure sensor of claim 14, wherein the overpressure diaphragm portion has a stiffness that is greater than a stiffness of the pressure sensing diaphragm portion.

16. The differential pressure sensor of claim 14, wherein the first cavity has a first depth, and the second cavity has second depth that is less than the first depth.

17. The differential pressure sensor of claim 14, wherein the first overpressure stop structure protrudes into a portion of the first cavity such that a gap is maintained between the first overpressure stop structure and the pressure sensing diaphragm portion prior to overpressure being applied to the diaphragm structure.

18. The differential pressure sensor of claim 14, further comprising a plurality of piezoelectric bridge resistors coupled to the pressure sensing surface, the piezoelectric bridge resistors electrically connected to a plurality of bond pads on the diaphragm structure.

19. The differential pressure sensor of claim 18, wherein the lower surface of the top cap includes multiple recessed areas adjacent to the second overpressure stop structure, and multiple undercut portions around a lower periphery of the top cap.

20. The differential pressure sensor of claim 19, wherein the multiple recessed areas are configured to provide clearance for the piezoelectric bridge resistors when overpressure is applied to the first side of the diaphragm structure.

\* \* \* \* \*